United States Patent
Ram

(10) Patent No.: US 10,230,812 B1
(45) Date of Patent: Mar. 12, 2019

(54) DYNAMIC ALLOCATION OF SUBTITLE PACKAGING

(71) Applicant: Amazon Technologies, Inc., Reno, NV (US)

(72) Inventor: Varun Ram, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 491 days.

(21) Appl. No.: 15/076,486

(22) Filed: Mar. 21, 2016

Related U.S. Application Data

(63) Continuation of application No. 62/288,991, filed on Jan. 29, 2016.

(51) Int. Cl.
*H04L 29/08* (2006.01)
*H04L 29/06* (2006.01)

(52) U.S. Cl.
CPC .......... *H04L 67/2857* (2013.01); *H04L 67/02* (2013.01); *H04L 67/327* (2013.01); *H04L 67/42* (2013.01)

(58) Field of Classification Search
CPC ......... H04L 29/02; H04L 29/06; H04L 29/12; H04L 65/605; H04L 29/08729; H04L 65/602; H04L 65/607; H04L 67/02; H04L 65/4084; H04L 65/1073; H04L 67/06; H04L 67/2823; H04L 67/2857; H04L 29/06455; H04L 29/06482; H04L 29/06489; H04L 29/06503; H04L 61/2007; H04L 29/06476; H04L 29/08756; H04L 63/0227; H04L 63/0428; H04L 65/60; H04L 65/80; H04L 67/1023; H04L 67/142; H04L 67/146; H04L 67/2828;
(Continued)

(56) References Cited

U.S. PATENT DOCUMENTS 7,508,450 B1* 3/2009 Abernethy, Jr. ... H04N 5/44513
348/465
8,515,248 B2* 8/2013 Kim ..................... G11B 27/105
386/239
(Continued)

*Primary Examiner* — Greg C Bengzon
(74) *Attorney, Agent, or Firm* — Hogan Lovells US LLP

(57) ABSTRACT

A set of transcoding techniques are described for transcoding or otherwise processing content, such as media content that includes textual information (e.g., subtitles), to implement subtitles container conversion from one streaming media format to another, with the ability to combine and split input subtitle segments to create subtitle streams of differing lengths with minimal processing overhead. A copy of textual information is stored at a content delivery network (CDN) point-of-presence (POP) server, network edge server device, or other device. When a device requests the content, the CDN POP server determines the type of device based on the information contained in the request and transcodes the textual information substantially in real-time into the correct encoding for that particular type of device when providing the textual information to the device. For example, if the requesting device is recognized to be a mobile phone having a particular operating system, the system can transcode the textual information into an appropriate format. The transcoding can be performed dynamically at the time of transmitting the textual information to the device.

15 Claims, 12 Drawing Sheets

(58) Field of Classification Search
CPC ....... H04L 67/303; H04L 67/32; H04L 67/42;
H04L 69/329; H04M 11/06; H04M
1/72522; H04M 1/72547; H04N 7/0885;
H04N 7/0882; H04N 21/488; H04N
21/4884; H04N 21/4886; H04N 21/4888;
H04N 21/633; H04N 21/6332; H04N
21/6336; H04N 21/6371; H04N 21/6373;
H04N 21/6377; H04N 21/64746; H04N
21/64753; H04N 21/64769; H04N
21/8586; H04N 21/85403; H04N
21/85406; H04N 21/8543; H04N
21/8545; H04N 21/8547; H04N 21/4516;
H04N 21/4621; G11B 27/036; G06F
17/30796; G06F 9/5055; G06F 17/2258;
G06F 17/30861; H04H 20/31; H04H
60/13; H04H 60/27; H04H 60/73; H04H
60/31; H04H 60/37; H04W 28/06; H04W
28/14; H04W 4/00; H04W 4/18; H04W
88/16

See application file for complete search history.

(56) References Cited

U.S. PATENT DOCUMENTS

| | | | | |
|---|---|---|---|---|
| 9,560,414 B1* | 1/2017 | Chalasani | G09G 5/377 |
| 9,860,574 B2* | 1/2018 | Oh | H04N 21/4884 |
| 9,979,902 B2* | 5/2018 | Newton | H04N 5/278 |
| 2003/0035063 A1* | 2/2003 | Orr | H04N 7/0882 | 348/465 |
| 2003/0093802 A1* | 5/2003 | Cho | H04N 7/17336 | 725/90 |
| 2006/0013563 A1* | 1/2006 | Adolph | H04N 5/278 | 386/240 |
| 2006/0070099 A1* | 3/2006 | Sato | H04N 21/235 | 725/50 |
| 2006/0140496 A1* | 6/2006 | Gandolph | H04N 1/64 | 382/245 |
| 2008/0129867 A1* | 6/2008 | Montua | H04N 7/088 | 348/468 |
| 2009/0219440 A1* | 9/2009 | Maertens | G11B 27/034 | 348/468 |
| 2009/0238539 A1* | 9/2009 | Isobe | G11B 27/034 | 386/248 |
| 2009/0303382 A1* | 12/2009 | Hamada | H04N 9/8233 | 348/468 |
| 2010/0046925 A1* | 2/2010 | Kusunoki | G06F 17/30858 | 386/239 |
| 2010/0104257 A1* | 4/2010 | Broberg | H04N 5/76 | 386/291 |
| 2010/0259676 A1* | 10/2010 | Swan | G06K 9/3266 | 348/468 |
| 2011/0044662 A1* | 2/2011 | Gandolph | H04N 5/278 | 386/285 |
| 2011/0119709 A1* | 5/2011 | Kim | H04N 19/597 | 725/39 |
| 2011/0149153 A1* | 6/2011 | Nam | H04N 21/4307 | 348/468 |
| 2011/0164673 A1* | 7/2011 | Shaffer | H04N 7/0885 | 375/240.01 |
| 2011/0246660 A1* | 10/2011 | Bouazizi | H04L 65/4084 | 709/231 |
| 2011/0314485 A1* | 12/2011 | Abed | G06F 17/30796 | 725/14 |
| 2012/0176540 A1* | 7/2012 | Labrozzi | H04N 21/4312 | 348/468 |
| 2012/0197770 A1* | 8/2012 | Raheja | G06F 17/2258 | 705/30 |
| 2012/0254456 A1* | 10/2012 | Visharam | H04N 21/2343 | 709/231 |
| 2012/0259994 A1* | 10/2012 | Gillies | H04L 12/1881 | 709/231 |
| 2012/0320267 A1* | 12/2012 | Landow | H04N 21/2353 | 348/468 |
| 2013/0007576 A1* | 1/2013 | Lund | H04N 21/4307 | 715/203 |
| 2013/0076981 A1* | 3/2013 | Labrozzi | H04N 5/04 | 348/500 |
| 2013/0103849 A1* | 4/2013 | Mao | H04N 21/8456 | 709/231 |
| 2013/0185760 A1* | 7/2013 | Yamagishi | H04N 21/235 | 725/137 |
| 2013/0291001 A1* | 10/2013 | Besehanic | H04N 21/44204 | 725/20 |
| 2014/0225987 A1* | 8/2014 | Kataoka | H04N 13/128 | 348/43 |
| 2014/0281002 A1* | 9/2014 | Sun | H04L 29/06455 | 709/231 |
| 2014/0281009 A1* | 9/2014 | Moorthy | G06F 17/30017 | 709/231 |
| 2014/0282711 A1* | 9/2014 | Xiong | H04N 21/4856 | 725/34 |
| 2014/0300812 A1* | 10/2014 | Uchimura | H04N 21/4318 | 348/468 |
| 2014/0380356 A1* | 12/2014 | An | H04N 21/4722 | 725/32 |
| 2015/0066505 A1* | 3/2015 | Baker | G06F 17/30746 | 704/235 |
| 2015/0208024 A1* | 7/2015 | Takahashi | H04N 21/431 | 386/353 |
| 2015/0208102 A1* | 7/2015 | Takahashi | H04N 21/4854 | 348/441 |
| 2015/0215564 A1* | 7/2015 | Robinson | H04N 5/44508 | 348/468 |
| 2015/0255121 A1* | 9/2015 | Gandolph | G11B 27/034 | 386/241 |
| 2015/0271438 A1* | 9/2015 | Gandolph | H04N 5/85 | 386/244 |
| 2015/0281634 A1* | 10/2015 | Gandolph | H04N 5/85 | 386/244 |
| 2015/0288730 A1* | 10/2015 | Friedrich | H04L 65/607 | 709/219 |
| 2015/0382042 A1* | 12/2015 | Wagenaar | H04N 21/26258 | 725/34 |
| 2016/0142510 A1* | 5/2016 | Westphal | H04L 67/322 | 709/219 |
| 2016/0182979 A1* | 6/2016 | McCoy | H04N 21/85406 | 725/32 |
| 2016/0191959 A1* | 6/2016 | Chittella | H04N 21/4888 | 725/32 |
| 2016/0198012 A1* | 7/2016 | Fablet | H04L 65/4084 | 709/231 |
| 2016/0328174 A1* | 11/2016 | Uchimura | H04N 5/85 |
| 2017/0048485 A1* | 2/2017 | Dewa | H04N 21/431 |
| 2017/0064371 A1* | 3/2017 | Kitazato | H04N 5/278 |
| 2017/0272485 A1* | 9/2017 | Gordon | H04N 21/222 |
| 2017/0353516 A1* | 12/2017 | Gordon | H04N 21/8456 |

* cited by examiner

DYNAMIC ALLOCATION OF SUBTITLE PACKAGING

CROSS-REFERENCES TO RELATED APPLICATIONS

This application is a continuation of U.S. Application No. 62/288,991, entitled "DYNAMIC ALLOCATION OF SUBTITLE PACKAGING," filed Jan. 29, 2016; which is incorporated herein by reference for all purposes.

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. As such, these companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

Transcoding is the decoding and recoding of digital content from one format to another. Transcoding is often necessary to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding comes from the vast range of devices, networks, and channels that may need to be supported. Further, in many instances, the presentation of textual information can be an important part of the digital content and can add to the complexity of transcoding the digital content.

A content delivery network (CDN) is an interconnected network of computer nodes that contain copies of various types of data. Using a CDN can improve access to the data cached at the nodes by increasing access bandwidth/redundancy and reducing access latency. CDNs are often used to provide access to media content.

BRIEF DESCRIPTION OF THE DRAWINGS

Various embodiments in accordance with the present disclosure will be described with reference to the drawings, in which.

DETAILED DESCRIPTION

Figure 1:
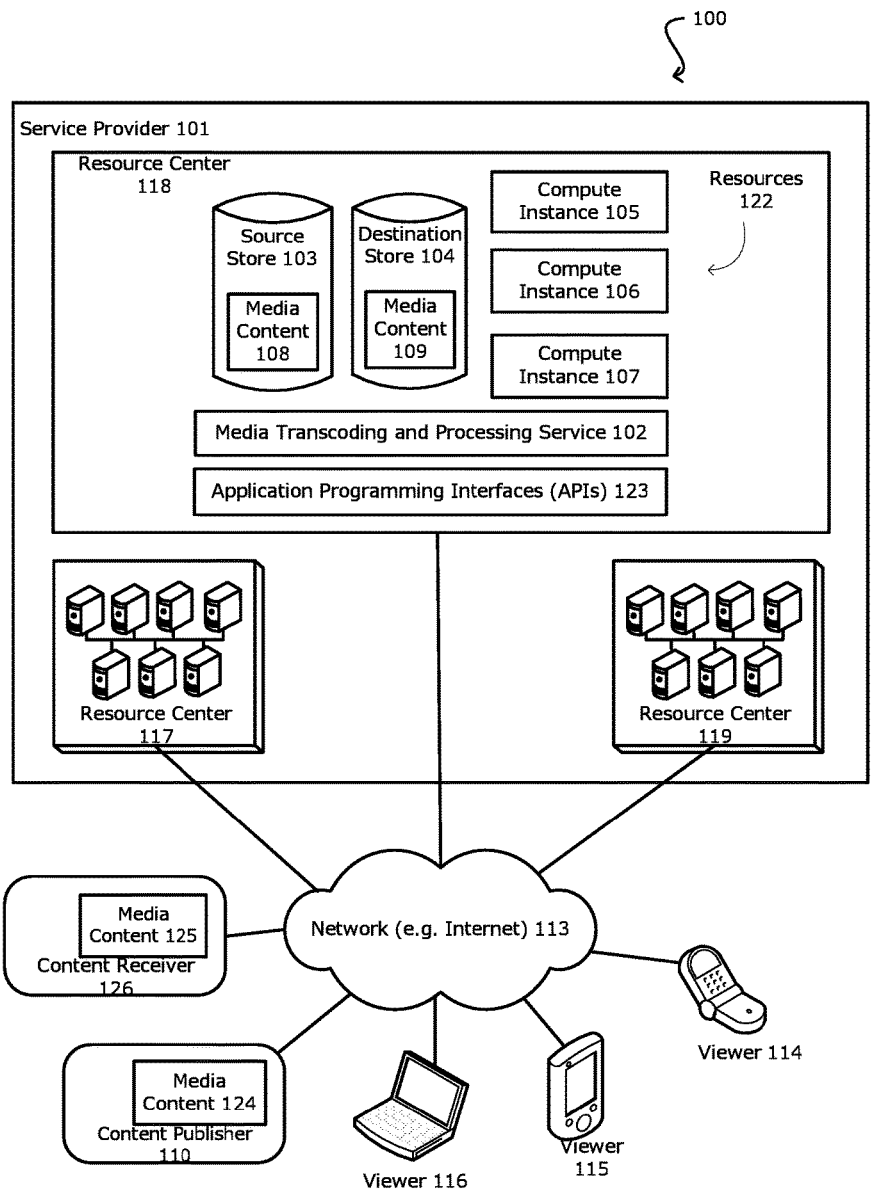
FIG. 1 is a general illustration of an environment in which the transcoding service can be utilized, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for processing content. In particular, the various embodiments provide approaches for transcoding or otherwise processing content, such as media content that includes textual information (e.g., subtitles), to implement subtitles container conversion from one streaming media format to another, with the ability to combine and split input subtitle segments to create subtitle streams of differing lengths with minimal processing overhead.

In accordance with various embodiments, a transcoding system or service is described that implements subtitles container conversion from one steaming media format to another for encoding media content in real-time from a network edge (e.g. content delivery network point-of-presence) or other location. A copy of media content (e.g. an audio, video, or multimedia file) that includes textual information can be stored at a location such as a server located at the network edge (e.g. content delivery network (CDN) point-of-presence (POP)). The service can receive a request to access textual information associated with the media content from a client device (e.g. mobile phone, tablet computer) and a component such as an edge server located at the POP can convert the request input media content into the requested output at that time. Such an approach can eliminate the need to predetermine textual information associated with media content streams as well as boost encoding efficiency, as only textual information that is consumed is generated. Further, in accordance with various embodiments, such an approach allows for combining and splitting input textual information associated with the input content media into segments in substantially real-time. Since minimal processing is involved in serving up an output URL, approaches described herein allow for a much larger amount of output media content stream configurations, including support for textual information streams with varying durations by combining or splitting the input textual information at the time of request. Further still, for a request requiring a bitrate-switching latency above a desired threshold, shorter textual information duration segments can be encoded. Likewise, longer durations can be created on demand, regardless of the segment length of the input. Advantageously, approaches described herein allow for increased utilization of encoding resources and minimized wasted cycles spent on computing textual information that may otherwise not be used. Further still, approaches offer the flexibility to generate multiple encoded outputs of different formats and durations with minimal processing overhead.

FIG. 1 is a general example of an environment 100 in which the transcoding and other processing of media content can be implemented, in accordance with various embodiments. As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer or client devices (114, 115, 116). It should be noted that when media content is delivered to a "viewer" or an entity viewing the media or other such content, the content is delivered to a client or other such device of the viewer. As used herein, viewer and client device may be used interchangeably. In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer or client devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other features of this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others such as client devices, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers on their client device or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the transcoding service. As one option, the pricing of transcoding service could be based on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

Figure 2:
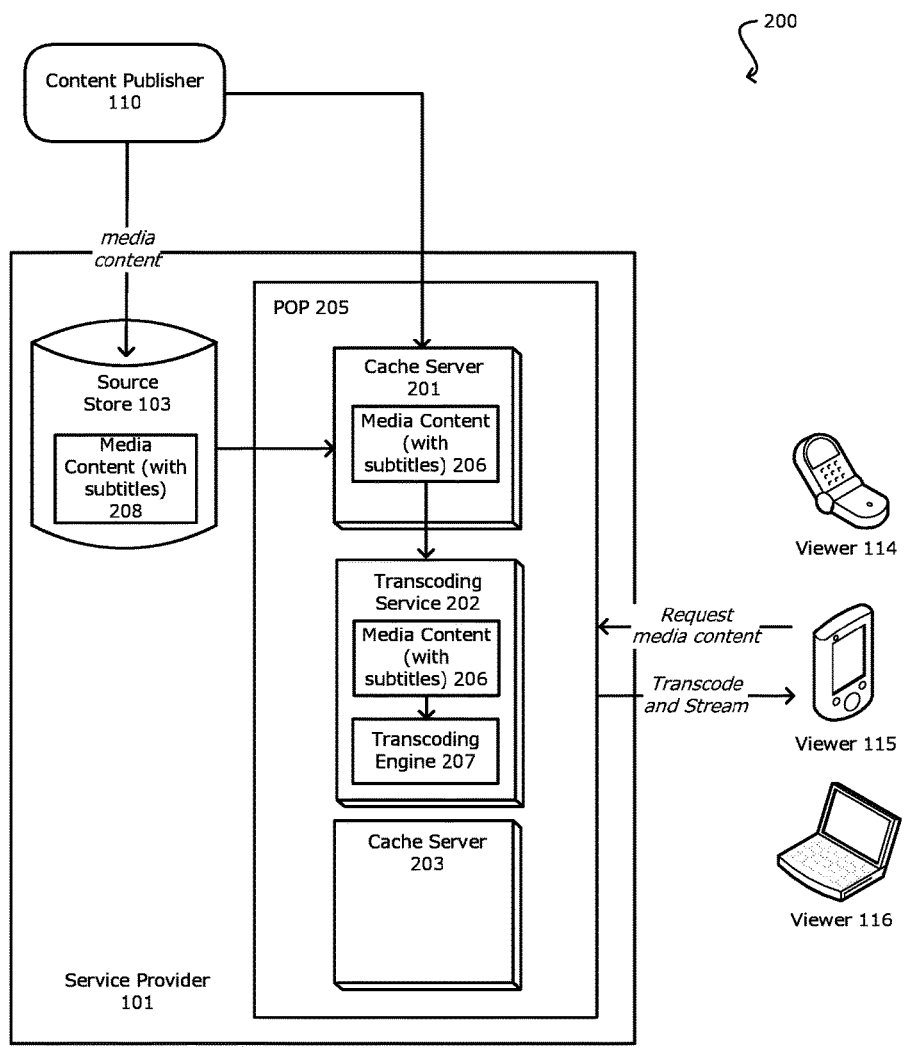
FIG. 2 is an example of an environment where media content can be dynamically transcoded, in accordance with various embodiments.

FIG. 2 is an example of a network environment 200 where media content that includes textual information (e.g., subtitles) can be dynamically transcoded. It should be understood that reference numbers for like components may be carried over between figures for purposes of explanation, but this should not be interpreted as limiting the scope of the various embodiments. As described, the media content can include textual content such as subtitles. Subtitles can be derived from either a transcript or screenplay of the dialog or commentary in films, television programs, video games, and the like, usually displayed at the bottom of a display screen, but can also be at the top of the display screen if there is already text at the bottom of the display screen. The subtitles can either be a form of written translation of a dialog in a foreign language, or a written rendering of the dialog in the same language, with or without added information to help viewers follow the dialog. Subtitle formats can include HLS/WebVTT, MSS/TTML, SMPTE-TT, MPEG-DASH, for example.

In conventional approaches to encoding subtitles, subtitles are pre-rendered with the video at the source. In this example, the source can be at the content publisher 110 or the service provider 101. One of the content publisher, service provider, or other entity would embed the subtitles with audio and video data into multimedia files before providing access (e.g., streaming, providing for download, etc.) to the media by a user. One example approach involves run-length-encoding bitmap images of the subtitle text information. The run-length encoding of bitmaps provides an efficient way of storing the information, and since bitmaps are a pictorial representation of the text rather than a textual representation, there are no additional requirements to render the subtitles, such as utilizing embedded or resident font files. However, despite its advantages, because the text information is stored as bitmaps, it adapts poorly to changes in image frame size and as a result cannot be scaled with acceptable visual results to multiple sizes. In addition to the problem with scalability, bitmap representations are not easily searchable as text, which is an attractive feature from the perspective of categorization, metadata and archival activities.

The use of the actual text with respect to a known alphabet of a particular language to represent the textual information, e.g., a title, chapter names, and/or a dialogue in a movie, is one alternative to using bitmaps to represent the information. Using text in a movie typically requires the encoding of the text in a commonly acceptable representation. ASCII and Unicode are two such examples. However, font files for various languages may be in the 1 to 10 Mbytes range, and can sometimes be as large as 30 Mbytes. While the size of these fonts may not be an issue for processing on a personal computer, in an embedded or a consumer electronic device, such large font sizes may pose a problem especially if the fonts are expected to be dynamically available in memory for the device's rendering engine. When the size of the required representation file exceeds the resource handling capability of an embedded device, the behavior exhibited by these devices and the resulting user-experience may be non-uniform.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state. However, the subtitles are pre-rendered at different lengths, even if the media is never consumed. These both limits the number of different segment lengths one could have, as well as places unnecessary processing burden on the encoder.

In accordance with various embodiments, approaches are described for transcoding or otherwise processing content, such as media content that includes textual information (e.g., subtitles), to implement subtitles container conversion from one streaming media format to another, with the ability to combine and split input subtitle segments to create subtitle streams of differing length on the output with minimal processing overhead and upon a players request of a segment. As previously described, a content publisher 110 can provide the media content 108 to the source store 103 or some other storage location provided by the service provider 101. The service provider can then transfer the textual information and associated media content to a cache server 201 (or another server) residing at the network edge location, such as a content delivery network (CDN) point of presence (POP) 205. The transfer may make access to the media more efficient for users proximate to the POP. In an alternative embodiment, the content publisher 110 may provide the textual information and associated media content 108 directly to the POP 205 from a location on the content publisher 110. As previously mentioned, the CDN of the service provider may include a plurality of POPs (such as POP 205) which may be geographically distributed to various locations that are proximate to the end users and devices. Several POPs can use the same internet protocol (IP) address and the routing scheme can be utilized that to find a POP that is the closest to an end user in terms of network hops required to reach it. It should be noted that while the source store 103 is shown as being located outside of POP 205 in FIG. 2, this is not intended to be a limitation to the various embodiments described herein. In some embodiments, the source store may be located at the same POP 205 and therefore may not need to be transferred. In other embodiments, the source store 103 may be located at another POP (or other resource center) and the transfer of the media content from the source store 103 to the POP 205 may occur in response to receiving the request for the textual information and associated media content at POP 205. Alternatively, the transfer of the textual information and associated media content from the source store 103 to POP 205 may be performed automatically upon placement of the media content into the source store.

In accordance with the illustrated embodiment, POP 205 can include a number of cache servers (201, 203) capable of storing a copy of the media content 206 locally to be made available to the various requesting devices. In addition, the POP 205 may include a transcoding service 202. When a viewer or client device (e.g. device 115) requests the textual information and/or associated media content from the POP 205, the request can be inspected to determine a device type (and other information such as application-type, OS-type, browser-type, etc.) associated with the requesting viewer or client device based on information contained in the request. For example, based on the HTTP header information contained in the request, it may be determined that the device 115 requesting the media file is an Apple® iPhone® running a particular version of the Apple® IOS operating system. In accordance with various embodiments, each device type can be associated with a particular type of encoding format that is suitable to display or render the media file on that device (based on the OS, application, display resolution, settings, etc.). In addition, a profile may be associated with the device type and may contain all of the processing settings and parameters necessary to transcode the media content into the format appropriate for the device. In various embodiments, a variety of information contained in the request can be used to select the type of format for transcoding the media content. For example, request parameters, uniform resource locator (URL) of the request, request metadata, or any other data embedded in the request or received along with the request may be used in this determination.

In accordance with an embodiment, once the type of device requesting the content is identified, the POP 205 can make a determination whether the copy 206 of the textual information and/or associated media content is in the appropriate format for being provided to the requesting device 115. If the textual information and/or associated media content are already in the appropriate format, the cache server 201 can simply provide the cached copy to the requesting device 115. If on the other hand, the textual information and/or associated media file is not in the correct format to be provided to the requesting device 115, the cache server 201 can provide the textual information and/or associated media content to the transcoding server 202 having a transcoding engine 207 to perform dynamic transcoding of the textual information and/or associated media content 208. In accordance with an embodiment, the transcoding service may transcode the textual information and/or associated media content based at least in part on the device type and various performance characteristics associated with the device. For example, once the device type is identified, the appropriate settings and parameters for transcoding the textual information and/or associated media may be selected based on the screen/display capabilities of the requesting device, which version of the operating system the device is running, the processing capacity of the device, available memory on the device and the like.

In accordance with an embodiment and as will be described further herein, the transcoding service 202 can further include processing the subtitle content to implement subtitles container conversion from one streaming media format to another, with the ability to combine and split input subtitles segments to create subtitles streams of differing length on the output with minimal processing overhead and upon a players request of a segment.

In accordance with an embodiment, the transcoding service 202 can utilize a graphics processing unit (GPU) configuration to transcode the media content 208 in an optimal performance manner. For example, the transcoding server 202 can use the compute unified device architecture (CUDA) as the computing engine in the GPU to encode the video content into the appropriate format for the requesting device. It should be noted that as previously mentioned, the term "transcoding" is not necessarily limited to changing the format of the media content, but may also include performing such functions as transmuxing, digital watermarking, segmenting, applying access controls, adding metadata, inserting advertisements, translating into various languages, transcribing, changing bit rates, sequencing, changing or adding audio associated with a video, or modifying, customizing, or making compatible various other features of content in any other manner. For example, if a requesting device is not able to handle a certain quality video stream, or a certain data transfer rate, the transcoding server 202 may adjust the quality of the video stream or the data transfer rate to accommodate the device.

In accordance with an embodiment, the transcoding server 202 can transcode the media content 208 in substantially real-time into the correct encoding format when responding to the request by transmitting bits of the media content to device 115. For example, the transcoding server 202 can stream the bits that have been encoded into the proper format to the device, while the transcoding engine 207 is transcoding the remaining bits of the media file. In accordance with one embodiment, the POP 205 can utilize an initial burst mode to stream the beginning portion of the media file transcoded at one bit rate and then complete the remaining portion of the media file at a different bit rate. This can help avoid any latency on the part of the requesting device that may be viewing the media content as it is being transcoded and streamed to it. In accordance with an embodiment, if the transcoding service 202 detects that the requesting device 115 has ceased downloading the media, the dynamic transcoding can be terminated in order to save the computing resources of the POP 205. For example, if the user stops viewing the video file, the transcoding server can halt the transcoding process and apply the GPU resource to other transcoding jobs that may be needed.

In some embodiments, the transcoding service 202 may select and perform the transcoding based at least in part on various network conditions, such as bandwidth, jitter, packets lost or the like. For example, if the network bandwidth is low due to high amounts of traffic/data, the transcoding service 202 may opt to transcode the media content at a lower bit rate or lower resolution in order to deliver the media content more efficiently to the requesting device.

Figure 3:
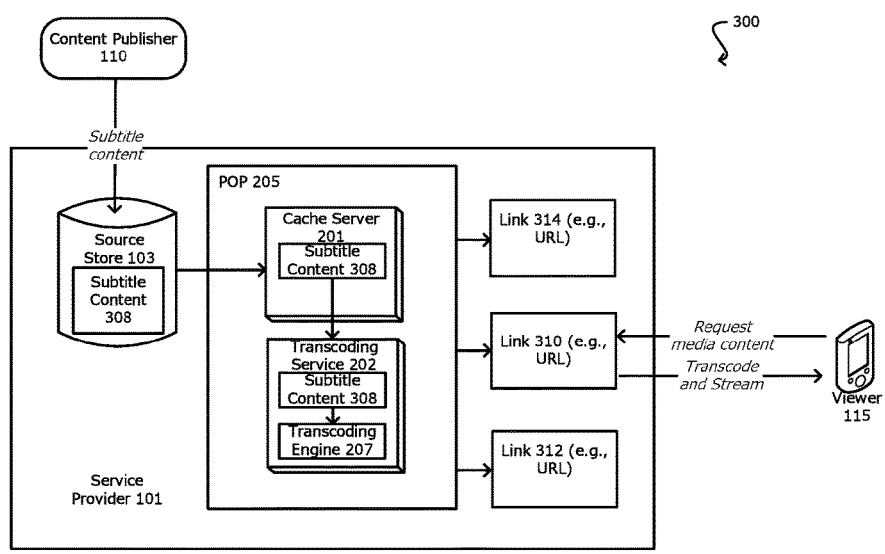
FIG. 3 is an example of an environment wherein textual information (e.g., subtitle content) can be dynamically transcoded, in accordance with various embodiments.

FIG. 3 illustrates an example environment 300 wherein textual information (e.g., subtitle content) can be dynamically transcoded. In this example, a content publisher 110 can provide the subtitle content 308 to a source store 103 or some other storage location provided by the service provider 101. As described, the subtitle content can be associated with video and/or other media content. Timing information associated with the textual information and the media content can be used to ensure that the subtitle content is aligned with the video content during playback. Example timing information includes presentation timestamp (PTS) information. In accordance with various embodiments, PTS is a timestamp metadata field embedded in the video content. As described herein, the input video content (or other media transport stream) can be provided by a content provider (e.g., content provider 101). During playback, PTS information can be used to achieve synchronization of programs' separate elementary media streams (e.g., Video, Audio, Subtitles) when presented to a viewer on their client device. The PTS can be given in units related to a program's overall clock reference, either Program Clock Reference (PCR) or System Clock Reference (SCR), which is also transmitted in the video content. Example units include a 64 bit integer number that represents the time in microseconds from the start of video content.

Determining timing information can be determined in a number of ways. In one such approach, the start of the video content is determined. The start of the video content can be measured, for example, from when the video content is received by a transcoder (e.g., transcoder service 202). As the video content is received, timing information such as PTS information associated with the video content can be determined. The PTS information of the video content can be associated with the subtitle content associated with the video content. During playback, the subtitle content can be synchronized with the video content by adjusting the decoding of the subtitle content and video content to a common master time base. The master time base may be one of the N decoders' clocks, the data source's clock, or it may be some external clock. Accordingly, in accordance with an embodiment, end-to-end synchronization can occur when encoders save time stamps at capture time, when the time stamps propagate with associated coded data to decoders, and when decoders use those time stamps to schedule presentations.

In an embodiment, the PTS information for the video content and subtitle content can be stored in source store 103 or some other data store. In some embodiments, the PTS information for the video and subtitle content can be segmented and stored in one or more data stores. Metadata or other information can be used to keep track of the different segments and where the different segments are stored. When subtitle content is requested, transcoding service 202 can use the metadata to access the appropriate data stores to retrieve PTS information and the PTS information can be used to associated the subtitle content with the video content.

Returning to FIG. 3, the example embodiment illustrates packing the encoded subtitle content for use by one or more client devices, such as viewer 115 that includes a player or other such client device. The service provider can then transfer the subtitle content 308 to a cache server 201 (or another server) residing at the network edge location, such as a content delivery network (CDN) point of presence (POP) 205. The transfer may make access to the subtitle content efficient for users proximate to the POP. In an alternative embodiment, the content publisher 110 may provide the subtitle content 308 directly to the POP 205 from a location on the content publisher 110.

In accordance with the illustrated embodiment, POP 205 can include a number of cache servers (201, 203) capable of storing a copy of the subtitle content 308 locally to be made available to the various requesting devices. In addition, the POP 205 may include a transcoding service 202. When a viewer or client device (e.g. device 115) requests the subtitle content 308 from the POP 205, the request can be inspected to determine a device type (and other information such as application-type, OS-type, browser-type, etc.) associated with the requesting viewer based on information contained in the request. In accordance with an embodiment, once the type of device requesting the content is identified, the POP 205 can make a determination whether the copy 206 of the subtitle content 308 in the appropriate format. If the subtitle content 308 is already in the appropriate format, the cache server 201 can simply provide the cached copy to the requesting device 115. If on the other hand, the subtitle content 308 is not in the correct format, the cache server 201 can provide the subtitle content 308 to the transcoding server 202 having a transcoding engine 207 to perform dynamic transcoding of the subtitle content 308.

In accordance with an embodiment, the transcoding server 202 can transcode the subtitle content 308 in substantially real-time in accordance with various embodiments described herein and provide access to the subtitles using one or more links (e.g., URLs 310, 312, and 314). As described, in conventional approaches, subtitles would be encoded at the origin with the video stream. However, this can limit the number of formats encoders can create, as well as limit the number of streams with differing segment durations, due to processing power restrictions. Streaming media formats such as HLS, MSS, HDS, and DASH allow for the output segment duration to be specified and changed at will to deal with latency or storage space constraints on the player side. Encoding subtitles at the origin does not allow for real-time generation of different subtitle formats at differing segment duration. Further, encoding subtitles at the origin means that the outputs are generated even if they are never consumed by players.

In accordance with various embodiments, transcoding engine 207 can dynamically transcode the subtitle content 308. A public endpoint (e.g., a URL) for a nonexistent output can be provided to access the transcoded subtitle content 308. When a player requests a manifest or segment of subtitle information, all of the processing required to convert the input subtitle information into the requested output is done at this time. Thereafter, in accordance with various embodiments, the service provider can store the converted subtitle content to one of cache servers 201, 203 or other server or storage component. The stored subtitle content can be made available to the various requesting devices in subsequent request for the subtitle content. For example, in the situation a subsequent request is received, the type of device requesting the content is identified. The POP 205 can make a determination whether a copy of the previously converted subtitle content is in the appropriate format for being provided to the requesting device. If the previously converted subtitle content is already in the appropriate format, the cache server can simply provide the cached copy to the requesting device.

In accordance with various embodiments, approaches described herein advantageously eliminate the need to pre-generate subtitle content streams and increase encoding efficiency at the transcoding engine 207, as only streams that are consumed are generated. Further, subtitle content can be combined or split substantially in real-time, as further described in FIGS. 4, 5, and 6. Further still, since no processing is involved in providing an output URL (e.g., links 310, 312, 314), a much larger amount of output subtitle content stream configurations can be supported, including support for subtitle content streams with varying length subtitle durations by combining or splitting input segments at player request time. Further still, for players needing superior bitrate-switching latency, shorter subtitles duration segments can be encoded. Likewise, longer durations can be created on demand, regardless of the segment length of the input. Advantageously, such approaches allow for improved utilization of encoding resources, increases in encoder resource- to- player-consumption efficiency, and energy consumption savings by not using resources to encode subtitle information on streams that hat will never be used.

Figure 4:
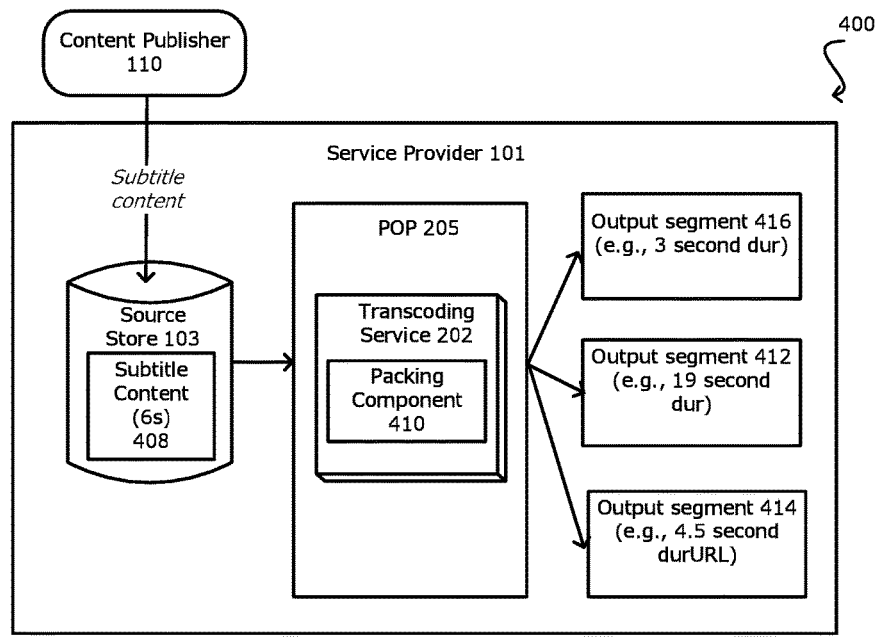
FIG. 4 is an example of an environment wherein textual information (e.g., subtitle content) can be dynamically combined and/or spilt, in accordance with various embodiments.

FIG. 4 illustrates a high level example 400 of transcoding textual information wherein textual information (e.g., subtitle content) is dynamically combined and/or spilt in accordance with various embodiments. In this example, a content publisher 110 can provide subtitle content 408 to the source store 103 or some other storage location provided by the service provider 101. In this example, the service provider 101 can transfer the subtitle content 408 to a content delivery network (CDN) point of presence (POP) 205. In accordance with the illustrated embodiment, POP 205 can include a number of cache servers (not shown) capable of storing a copy of the subtitle content 408 locally to be made available to the various requesting devices. In addition, the POP 205 may include a transcoding service 202 that includes a packing component 410 configured to combine and/or spilt subtitle content 408 for consumption by a requesting device. For example, the subtitle content 408 can be six seconds in duration. The packing component 410 can generate, for example, output segment 412 at 19 seconds in duration, output segment 414 at 4.5 seconds in duration, and output segment 416 at 3 seconds in duration.

Figure 5:
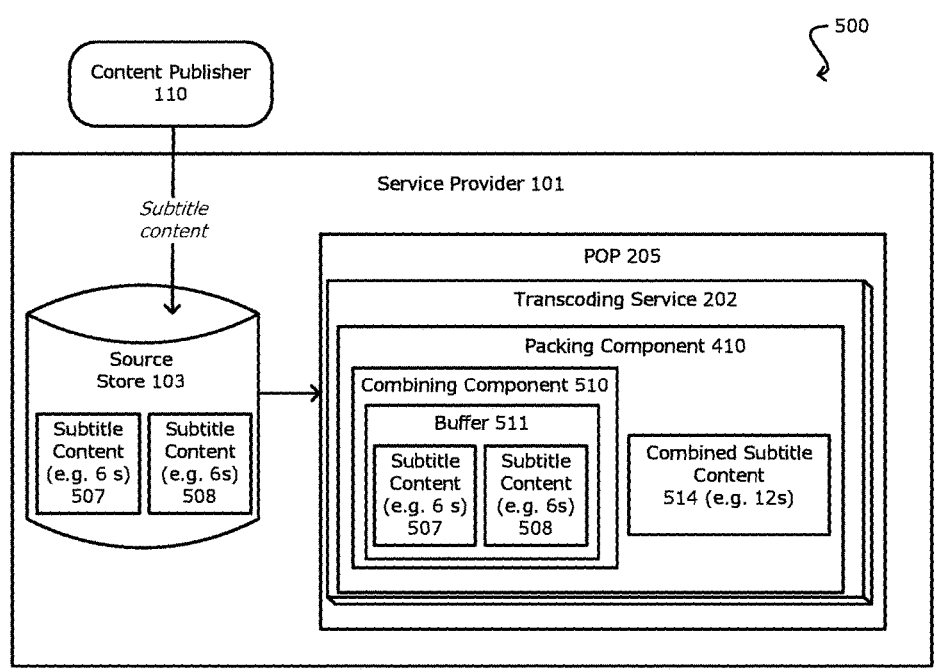
FIG. 5 is an example of an environment wherein textual information (e.g., subtitle content) can be dynamically combined, in accordance with various embodiments.

FIG. 5 illustrates an example 500 of transcoding textual information wherein textual information (e.g., subtitle content) is dynamically combined in accordance with various embodiments. In this example, a content publisher 110 can provide subtitle content 507 and 508 to the source store 103 or some other storage location provided by the service provider 101. In this example, subtitle content 507 is six seconds in duration and subtitle content 508 is six seconds in duration. The service provider 101 can transfer the subtitle content to a content delivery network (CDN) point of presence (POP) 205. In accordance with the illustrated embodiment, POP 205 can include a number of cache servers (not shown) capable of storing a copy of subtitle content 507 and 508 locally to be made available to the various requesting devices. In addition, the POP 205 may include a transcoding service 202 that includes a packing component 410 configured to combine subtitle content 507 and 508 using combining component 510 to generate combined subtitle content 514 for consumption by a requesting device. Subtitle content 507 and 508 can be stored temporarily in buffer 511. Buffer 511 can be any temporary or permanent storage component. When a player makes a subtitle segment request for a subtitle segment longer in duration than the duration of input segments 507 and 508, combining component 410 can parse the input subtitle content 507 and input subtitle content 508 into a mezzanine format, combine the subtitles and timestamps into one larger file in the mezzanine format, and convert it to its output format as described herein. In accordance with various embodiments, a mezzanine file is a digital master that is used to create copies of video information for streaming or download. In this example, a request is received for a twelve second subtitle segment. Combining component 510 provides subtitle content 507 and 508 to buffer 511. Combining component parses subtitle content 507 and 508 into a mezzanine or other such format, combines subtitle content 507 and 508 and timestamps into a mezzanine format, and is converted to an appropriate output format as combined subtitle content 514. In this example, the combined subtitle content 514 is twelve seconds in duration and in an appropriate format for the requesting player.

In accordance with various embodiments, determining the appropriate format for the requesting player can include, for example inspecting the request to determine a device type (and other information such as application-type, OS-type, browser-type, etc.) associated with the requesting player based on information contained in the request. For example, based on the HTTP header information contained in the request, it may be determined that the device requesting the media file is an Apple® iPhone® running a particular version of the Apple® IOS operating system. In accordance with various embodiments, each device type can be associated with a particular type of encoding format that is suitable to display or render the subtitle content 514 on that device (based on the OS, application, display resolution, settings, etc.). In addition, a profile may be associated with the device type and may contain all of the processing settings and parameters necessary to transcode the media content into the format appropriate for the device. In various embodiments, a variety of information contained in the request can be used to select the type of format for transcoding the media content. For example, request parameters, uniform resource locator (URL) of the request, request metadata, or any other data embedded in the request or received along with the request may be used in this determination.

Figure 6A:
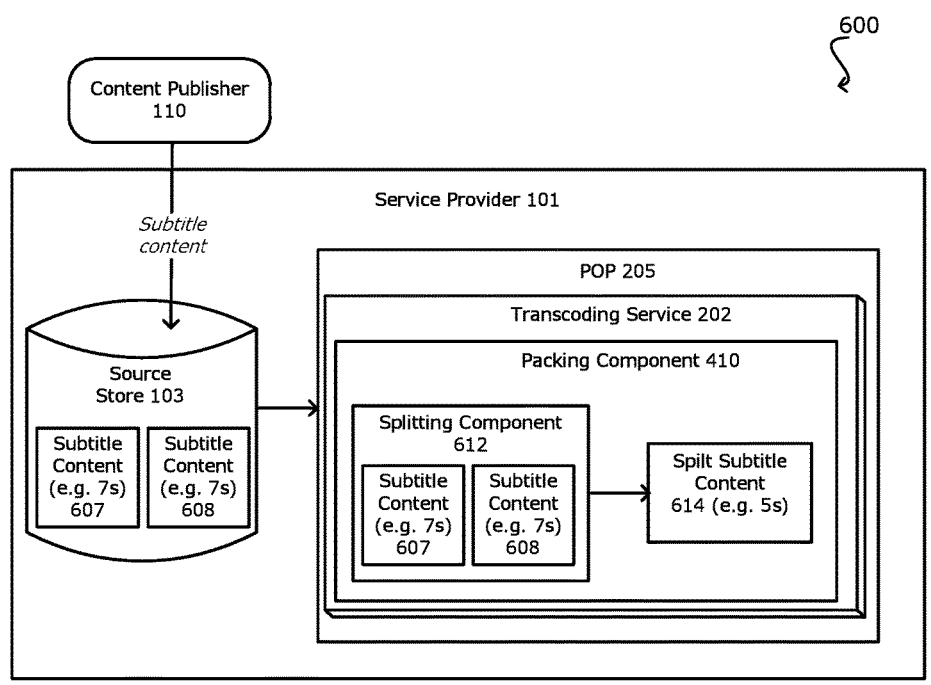
FIGS. 6A and 6B is an example of an environment wherein textual information (e.g., subtitle content) can be dynamically spilt, in accordance with various embodiments.
Figure 6B:
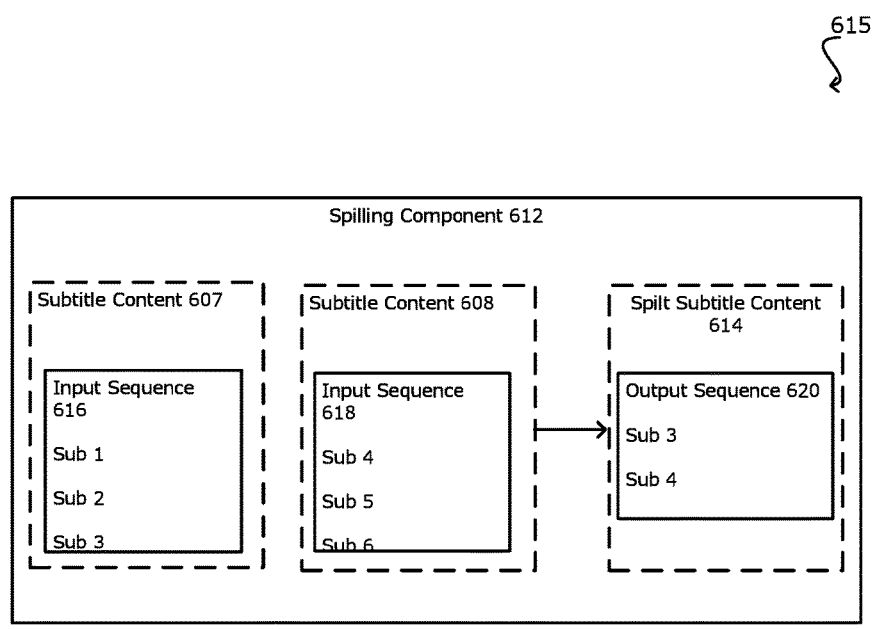

FIGS. 6A and 6B illustrate an example of transcoding textual information wherein textual information (e.g., subtitle content) is dynamically spilt in accordance with various embodiments. As shown in example 600 of FIG. 6A, a content publisher 110 can provide subtitle content 607 and 608 to the source store 103 or some other storage location provided by the service provider 101. In this example, subtitle content 607 is seven seconds in duration and subtitle content 608 is seven seconds in duration. The service provider 101 can transfer the subtitle content to a content delivery network (CDN) point of presence (POP) 205. In accordance with the illustrated embodiment, POP 205 can include a number of cache servers (not shown) capable of storing a copy of subtitle content 607 and 608 locally to be made available to the various requesting devices. In addition, the POP 205 may include a transcoding service 202 that includes a packing component 410 configured to spilt subtitle content 607 and 608 using spilling component 612 to generate combined subtitled content 614 for consumption by a requesting device. When a player makes a subtitle segment request for a subtitle segment shorter in duration than input subtitle segments 607 and 608 for a stream, the splitting component can determine the Presentation Timestamp (PTS) of the input subtitle segments 607 and 608 corresponding to the subtitle segment of the request and return the requested duration (after converting the input subtitle into our mezzanine format). If the requested subtitle PTS is in the middle of input subtitle segments 607 and 608, the splitting component can determine the next input segment, take the subtitles necessary from that until the required output duration has been filled, and generate the required output subtitle file.

FIG. 6B is an expanded view of splitting the subtitle content and using the Presentation Timestamp (PTS) of the input subtitle segments 607 and 608 and associated input media to generate combined subtitle content 614. In this example, input sequence 616 of subtitle content 607 includes subsections 1, 2, and 3. Input sequence 618 of subtitle content 608 includes subsections 3 and 4. The subsections are each a certain duration of time and associated with a PST. As described, in the situation where the requested subtitle PTS is in the middle of input subtitle segments, for example like input subtitle segments 607 and 608, the splitting component can determine the next input segment, take the subtitles necessary from that until the required output duration has been filled, and generate the required output subtitle file. In this example, subtitle content 607 is parsed to generate a partial output of partial duration of the requested duration. In this example, subsection three. Subtitle content 608 is parsed to generate a partial output of the partial duration of the requested duration. In this example, subsection four. Output sequence 620 of combined subtitle content 614 can be generated by combining subsection three and subsection four. The resulting combined subtitle content 614 is at the requested duration. In this example, the two seven second input segments are spilt into a requested five second segment. Thereafter, the combined subtitle content 614 is converted to an appropriate output format as described herein.

Figure 7:
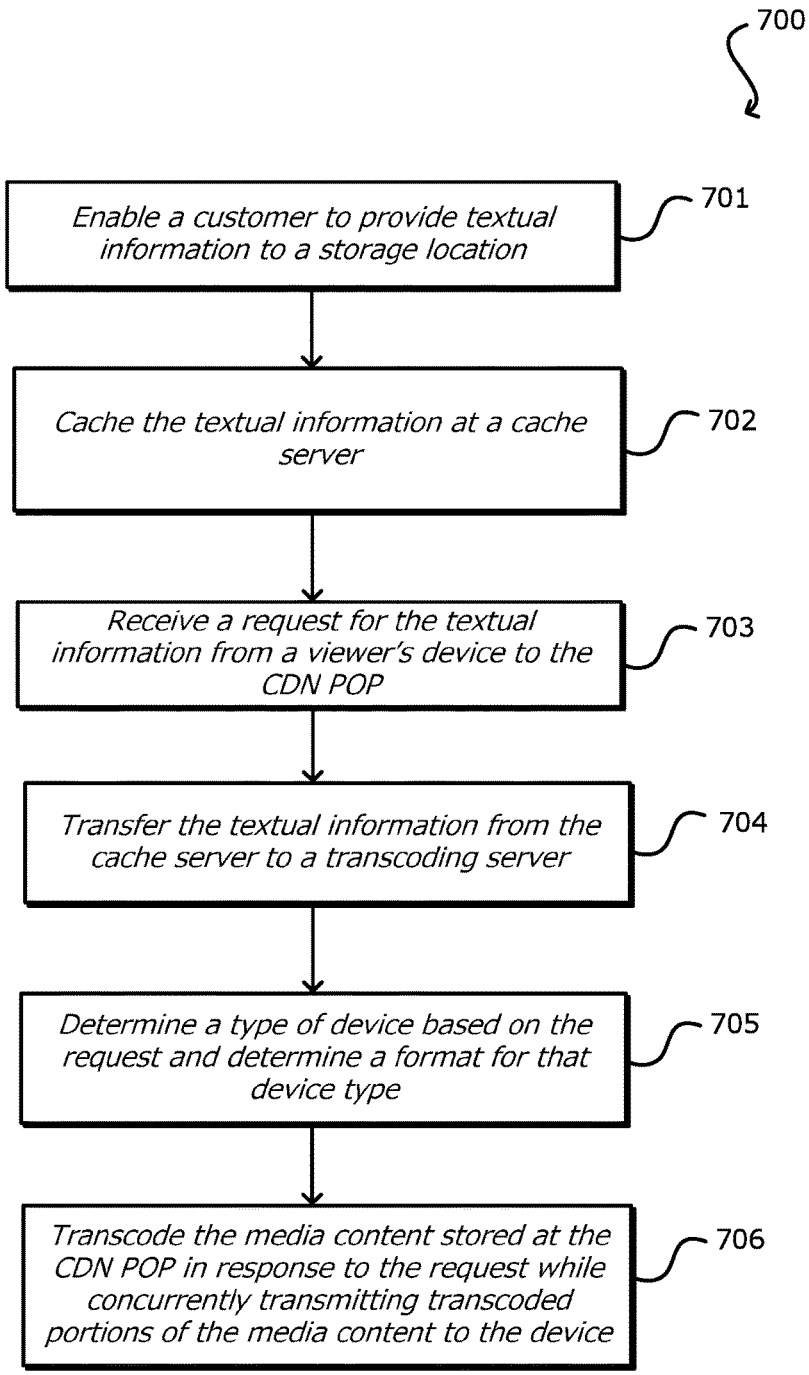
FIG. 7 illustrates an example process 700 for dynamic encoding of textual information (e.g., subtitle content), in accordance with various embodiments.

FIG. 7 illustrates an example process 700 for dynamic encoding of textual information (e.g., subtitle content), in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in operation 701, the service provider can enable a customer to provide textual information (e.g., subtitle content) to an input store, as described in connection with FIG. 1. For example, the service provider can expose APIs or provide a graphical interface for the content owners and content publishers to upload their media content and/or textual information to an input store on one of the servers maintained by the service provider. The textual information that is uploaded may be in a particular encoding format, such as HTTP live Streaming (HLS) for example.

In operation 702, once the textual information has been uploaded to the input store (or some other storage location) by the content publisher, the textual information can be optionally cached, for example, at the various content delivery network POPs. In some embodiments, the caching of the textual information can be performed automatically upon receiving the file, or at a time that the textual information is requested and provided to users at the various POPs. In other embodiments, the textual information is not cached at a cache server.

In operation 703, a request for the textual information can be received from a requesting device. For example, the request can be received from a viewer on a mobile phone or other client device wanting to stream and view the video content with associated textual information, or may be requested from a personal computer (PC) utilizing a web browser, or any other approach utilized by the various viewers on their client or other such device. In accordance with an embodiment, the request can be an HTTP request, including one or more HTTP headers that define the operating parameters of the transaction. In various embodiments, the network edge can be any resource center that may include data centers, server farms, CDN POPs, or the like.

In operation 704, the textual information may be transferred from a cache server to a transcoding server at the POP. This may be performed in response to receiving the request for the textual information or alternatively, may be performed prior to receiving the request. In operation 705, a device type associated with the requesting device is determined based on the information contained in the request. For example, the HTTP headers typically contain some information about the device type that has initiated the HTTP request. The POP (e.g. transcoding server at the POP) can inspect this information and determine the device type based on the HTTP headers. In accordance with an embodiment, the device type can be associated with a particular encoding format that can be used to render the textual information on that device. The transcoding system can include a number of profiles associated with various devices, where the profiles indicate which encoding format is suitable for each device type (or its operating system). The POP can utilize these profiles to determine which form of encoding to perform on the textual information for the requesting device. In accordance with alternative embodiments, the requesting device can indicate in the request which particular encoding format the device would like to receive the textual information in.

In operation 706, the transcoding server can transcode the textual information cached at the POP in response to the request. In accordance with an embodiment, the server can transcode the textual information from one encoding format to another while concurrently streaming the encoded bits to the device. In this manner, the transcoding can be performed on-the-fly, eliminating the need to pre-transcode each textual information file into all the formats that are desired to be supported and thereby reducing the storage footprint and increasing the number of devices supported by the transcoding service. Transcoding the textual information can further include dynamically combining and/or splitting textual information in accordance with various embodiments. For example, in the situation where the input textual information is six seconds in duration, a packing component or other such component can generate, for example, a first output segment at 19 seconds in duration, a second output segment at 4.5 seconds in duration, and a third output segment at 3 seconds in duration based at least in part on the input textual information.

Figure 8:
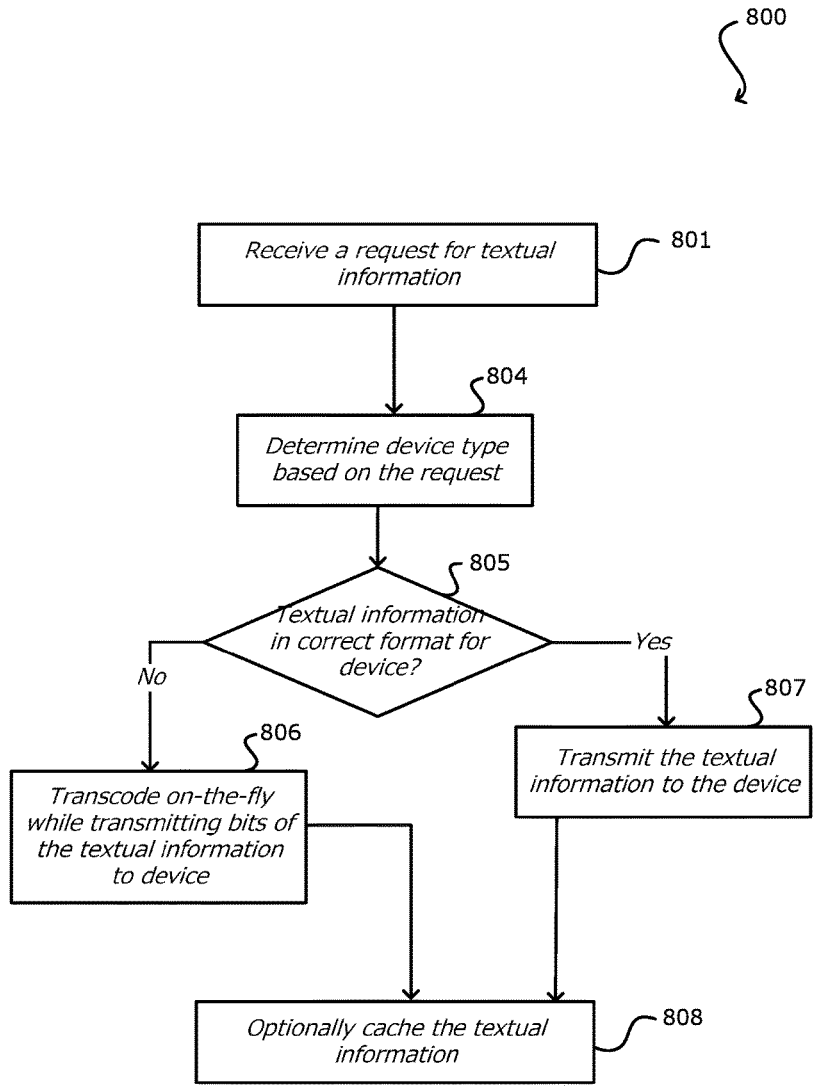
FIG. 8 is an example logical process 800 to dynamically transcode textual information (e.g., subtitle content), in accordance with various embodiments.

FIG. 8 is an example logical process 800 to dynamically transcode textual information (e.g., subtitle content), in accordance with various embodiments. As shown in operation 801, a network edge server (e.g. a server at the CDN POP) or other such device may receive a request for textual information. Upon receiving the request for the textual information, the device type is determined based on the information contained in the request, as shown in step 804. As previously mentioned, each device type or device software type may be associated with its own encoding format and this information may be available to the network edge. In some embodiments, if the textual information is not available at the network edge, the edge server may retrieve (or receive) the content from another location, such as the input store residing in a remotely located resource center.

In step 805, it is determined whether the cached copy of the textual information is in the appropriate format for the device type. If the textual information is already in the correct format, the edge server can simply transmit the textual information to the device to satisfy the request, as shown in step 807. If, on the other hand, the textual information is not in an encoding that is suitable for the requesting device, the edge server can perform transcoding on-the-fly while concurrently transmitting encoded bits to the device, as shown in step 806. For example, the edge server can perform HLS to DVB-SUB transcoding while at the same time streaming textual information to the requesting device. It should be noted that in alternative embodiments, the textual information need not be transcoded while it is being streamed to the device, but can instead be transcoded first and then provided to the device, or delivered in segments that have been transcoded and the like. Once the transcoding is complete, the edge server can optionally cache the textual information locally to satisfy any potential future requests, as shown in step 808. In accordance with various embodiments, the textual information can be cached in the original encoding format, the format into which it was just transcoded, or in both encoding formats.

Figure 9:
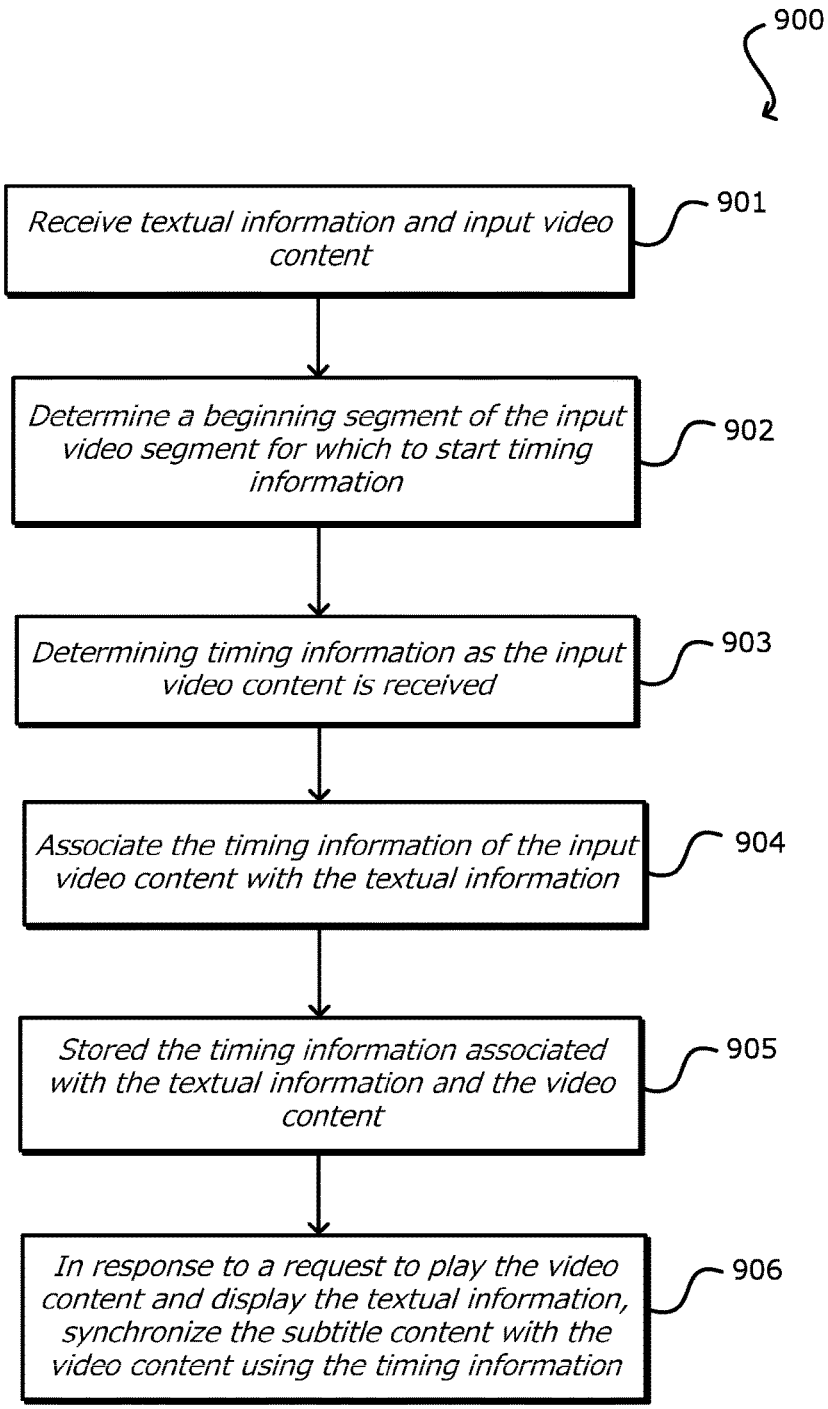
FIG. 9 is an example logical process 900 to determine timing information associated with textual information, in accordance with various embodiments.

FIG. 9 is an example logical process 900 to determine timing information associated with textual information, in accordance with various embodiments. As described, timing information associated with textual information and media content can be used to ensure that the textual information is aligned with the video content during playback. As shown in operation 901, textual information and input video content can be received at a source store or some other storage location provided by a service provider from a content publisher. In operation 902, a beginning segment of the video content for which to start timing information is determined. The start of the video content can be measured, for example, from when the video content is received by a transcoder (e.g., transcoder service 202). In operation 903, as the video content is received, timing information such as PTS information associated with the video content can be determined. The PTS information of the video content can be associated with the textual information, at operation 904. For example, the timing information associated with the video content can be mapped to the textual information based at least in part on corresponding locations between the video content and the textual information. At operation 905, the timing information associated the textual information and the video content can be stored. At operation 906, in response to a request to play the video content and display the textual information, the subtitle content can be synchronized with the video content during playback by adjusting the decoding of the subtitle content and video content to a common master time base using the timing information. The master time base may be one of the N decoders' clocks, the data source's clock, or it may be some external clock. Accordingly, in accordance with an embodiment, end-to-end synchronization can occur when encoders save time stamps at capture time, when the time stamps propagate with associated coded data to decoders, and when decoders use those time stamps to schedule presentations.

Figure 10:
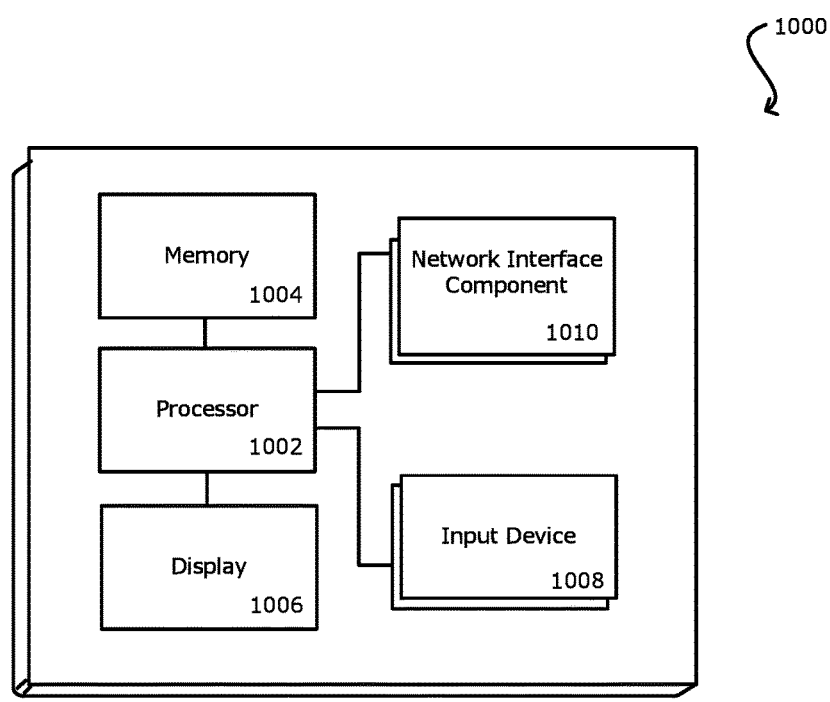
FIG. 10 illustrates a logical arrangement of a set of general components of an example computing device that can be utilized in accordance with various embodiments.

FIG. 10 illustrates a logical arrangement of a set of general components of an example computing device 1000. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one input element 1008 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1000 of FIG. 10 can include one or more network interface elements 1010 for communicating over various networks, such as a Wi-Fi, Bluetooth, RF, wired, or wireless communication systems. The device in many embodiments can communicate with a network, such as the Internet, and may be able to communicate with other such devices.

Figure 11:
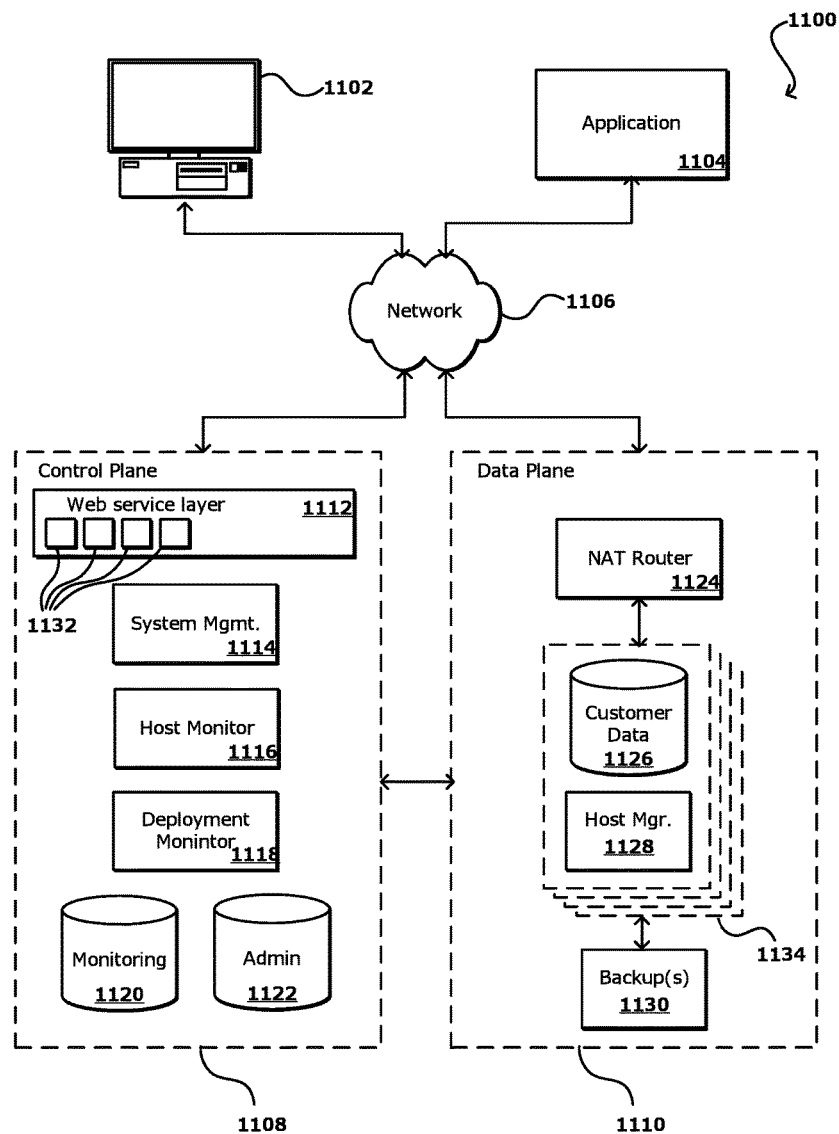
FIG. 11 illustrates an environment in which various embodiments can be implemented.

FIG. 11 illustrates an example of an electronic resource environment 1100 that can be used in accordance with various embodiments. In this example, a computing device 1102 for an end user is shown to be able to make calls through at least one network 1106 (e.g., the Internet, a cellular network, a wireless network, a local area network (LAN), etc.) into a control plane 1108 to perform a task such as to provision a data repository or launch a virtual machine in a data plane 1110. The user or an application 1104, for example, can access the repository and/or virtual machine directly through an interface of the data plane 1110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 1108 in this example is essentially a virtual layer of hardware and software components that handles control and management actions, such as provisioning, instantiating, launching, scaling, replication, etc. The control plane in this embodiment includes a Web services layer 1112, or tier, which can include at least one Web server, for example, along with computer-executable software, application servers, or other such components. The Web services layer also can include a set of APIs 1132 (or other such interfaces) for receiving Web services calls or requests from across the at least one network 1106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 1114, or other such system or service.

The control plane 1108 in this embodiment includes at least one host monitoring component 1116. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine ("VM") is created in the data plane, information for the VM can be written to a data store in the control plane, such as a monitoring data store 1120. It should be understood that the monitoring data store can be a separate data store, or can be a portion of another data store such as a distinct set of tables in an Admin data store 1122, or other appropriate repository. A host monitoring component 1116 can access the information in the monitoring data store to determine active VMs, resource instances, or other such resources or components 1134 in the data plane 1110. A host monitoring component also can perform other tasks, such as collecting log and/or event information from multiple components of the control plane and/or data plane, such as the Web service layer and various host managers 1128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 1134 (e.g., data instance or virtual machine) in the data plane can include at least one data store 1126 and a host manager component 1128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 1116 in the control plane 1108 can communicate periodically with each host manager 1128 for monitored instances 1134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 1118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

As discussed, once an instance is provisioned and a user is provided with a DNS address or other address or location, the user can send requests "directly" to the data plane 1110 through the network using a Java Database Connectivity (JDBC) or other such client to directly interact with that instance 1134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 1102 or application 1104, for example, can be directed to a network address translation (NAT) router 1124, or other appropriate component, which can direct the request to the actual instance 1134 or host corresponding to the DNS of the request. As discussed, such an approach allows for instances to be dynamically moved, updated, replicated, etc., without requiring the user or application to change the DNS or other address used to access the instance. As discussed, each instance 1134 can include a host manager 1128 and a data store 1126, for example, and can have at least one backup instance or copy in persistent storage 1130. Using such an approach, once the instance has been configured through the control plane, a user, application, service, or component can interact with the instance directly through requests to the data plane, without having to access the control plane 1108. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 1108 can be offered as at least one service by a provider that may or may not be related to a provider of the data plane 1110, but may simply be a third-party service that can be used to provision and manage data instances in the data plane, and can also monitor and ensure availability of those instances in a separate data plane 1110.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
enabling a customer to provide input textual information to an input store of a service provider, at least a portion of the input textual information associated with media content and being encoded using a first format;
storing a copy of the input textual information at a server residing in a content delivery network (CDN);
receiving a request for the input textual information from a client device to the server in the CDN;
inspecting the request and determining a device type associated with the client device based at least in part on information contained in the request, the device type being associated with a second format;
transcoding, in response to the request, the input textual information at the server in the CDN from the first format into the second format comprising:
determining timing information associated with the media content beginning from a start time of the media content and as the media content is provided to the service provider;
generating longer or shorter segments of the input textual information, based in part on duration, from the input textual information; and
enabling the media content and the longer or the shorter segments of the input textual information to be scaled and synchronized, the synchronization during playback of the media content using a mapping based at least in part on the timing information and corresponding locations between the media content and the longer or the shorter segments.

2. The computer implemented method of claim 1, wherein the input textual information is of a format including at least one of Microsoft MSS, HTTP Live Streaming (HLS) Web-VTT, DVB-SUB, Teletext, MPEG-DASH, HDS, or 608/708.

3. A computer implemented method, comprising:
receiving a request for textual information associated with media content, the request originating at a device, the textual information being stored at a network resource, the request containing information;
determining, on the network resource, a format for rendering the textual information on the device, the format being determined based at least in part on the information contained in the request;
transcoding, in response to the request, the textual information into the format suitable for rendering on the device comprising:
determining timing information associated with the media content beginning from a start time of the media content and as the media content is received to the network resource;
generating longer or shorter segments of the textual information, based in part on duration, from the textual information; and
enabling the media content and the longer or the shorter segments of the textual information to be scaled and synchronized, the synchronization during playback of the media content using a mapping based at least in part on the timing information and corresponding locations between the media content and the longer or the shorter segments.

4. The computer implemented method of claim 3, further comprising:
enabling a content publisher to upload the textual information to a store on the network resource of a service provider that provides network-accessible services; and
caching a copy of the textual information at the network resource by the service provider in response to having received the request for the textual information.

5. The computer implemented method of claim 3, wherein determining the format associated with the device further comprises:
inspecting at least one of: hypertext transfer protocol (HTTP) headers of the request, a parameter of the request, or a uniform resource locator (URL) of the request;
determining a type of the device based further on second information contained in the at least one of the HTTP headers, the parameter or the URL of the request; and
wherein the type of the device is associated with the format suitable for rendering the media content on the device and one or more settings for transcoding the format.

6. The computer implemented method of claim 3, further comprising:
determining that the device has discontinued downloading the textual information from the network resource; and
terminating the transcoding of the textual information on the network resource in response to a determination that the device has discontinued downloading the textual information.

7. The computer implemented method of claim 3, wherein the transcoding of the textual information further includes employing at least one processing unit to encode the textual information into the format while transmitting, to the device, bits of the textual information that have been transcoded into the format.

8. The computer implemented method of claim 3, further comprising:
identifying first timing information associated with the textual information;
identifying second timing information associated with the media content; and
aligning the textual information and the media content during playback using the first timing information and the second timing information.

9. The computer implemented method of claim 3, wherein the timing information includes presentation timestamp (PTS) information, and wherein the PTS information includes a timestamp metadata field for timing to be embedded into the media content.

10. The computer implemented method of claim 3, further comprising:
receiving first textual information associated with first timing information at a content publisher;
receiving second textual information associated with second timing information at the content publisher;
parsing the first textual information and the second textual information into a mezzanine file; and
generating third textual information associated with third timing information based at least in part on the mezzanine file, the third timing information being a combination of the first timing information and the second timing information.

11. The computer implemented method of claim 3, further comprising:
receiving first textual information associated with first timing information at a content publisher;
receiving a request for the textual information for a requested duration; and
generating second textual information associated with second timing information and third textual information associated with third timing information based at least in part on the first timing information, the second timing information and the third timing information being spilt from the first timing information and within a threshold duration of the requested duration.

12. A non-transitory computer readable storage medium storing one or more sequences of instructions executable by one or more processors to perform a set of steps comprising:
receiving a request for textual information associated with media content, the request originating at a device, the textual information being stored at a network resource, the request containing information;
determining, on the network resource, a format suitable for rendering the textual information on the device, the format being determined based at least in part on the information contained in the request;
transcoding, in response to the request, the textual information into the format for rendering on the device comprising:
determining timing information associated with the media content beginning from a start time of the media content and as the media content is received to the network resource;
generating longer or shorter segments of the textual information, based in part on duration, from the textual information; and
enabling the media content and the longer or the shorter segments of the textual information to be scaled and synchronized, the synchronization during playback of the media content using a mapping based at least in part on the timing information and corresponding locations between the media content and the longer or the shorter segments.

13. The non-transitory computer readable storage medium of claim 12, further comprising instructions for:
enabling a content publisher to upload the textual information to a store on the network resource of a service provider that provides network-accessible services; and
caching a copy of the textual information at the network resource by the service provider in response to having received the request for the textual information.

14. The non-transitory computer readable storage medium of claim 12, further comprising instructions for:
identifying first timing information associated with the textual information;
identifying second timing information associated with the media content; and
aligning the textual information and the media content during playback using the first timing information and the second timing information.

15. The non-transitory computer readable storage medium of claim 12, wherein the timing information includes presentation timestamp (PTS) information, and wherein the PTS information includes a timestamp metadata field for timing to be embedded into the media content.

* * * * *